United States Patent Office 3,634,403
Patented Jan. 11, 1972

3,634,403
ANTIBIOTIC SUBSTANCE DEFINED AS RIFAMYCIN L
Giancarlo Lancini, Pavia, Italy, assignor to Gruppo Lepetit, S.p.A., Milan, Italy
No Drawing. Filed June 9, 1969, Ser. No. 831,706
Claims priority, application Italy, June 12, 1968, 17,702/68
Int. Cl. C07d 99/04, 99/02
U.S. Cl. 260—239.3        2 Claims

ABSTRACT OF THE DISCLOSURE

A new rifamycin, namely rifamycin L, is described, which is obtained by subjecting rifamycin S or SV to the enzymatic activity of the mycelium of Streptomyces mediterranei ATTC 13685 in a water-lower alkanol medium. The product has good antibiotic activity and is practically devoid of toxicity.

---

This invention is concerned with a new antibiotic substance. More particularly, this invention provides a new antibiotic substance referred to hereinafter as rifamycin L, having the following structural formula

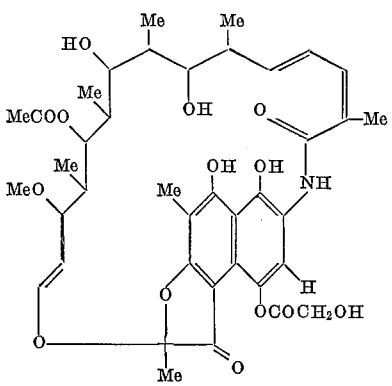

The rifamycin group represents a well known class of substances with antibiotic activity, some of which are directly produced by fermentation of the microorganism Streptomyces mediterranei ATTC 13685, while many other derivatives are prepared through chemical conversions of the naturally produced rifamycins. One of these substances is rifamycin B, which is produced by fermentation under submerged aerobic conditions of Streptomyces mediterranei ATTC 13685 together with other metabolities, from which it can be isolated in pure form, as described by P. Sensi et al. in Antibiotics Annual 1959–60, page 262.

One of the properties of rifamycin B is its activation in aqueous solution, i.e. its conversion into another substance with a higher degree of antibiotic activity. The activation product, called rifamycin S, can be converted by mild reduction into still another substance, called rifamycin SV. The structure of all these rifamycins has been elucidated and published by W. Oppolzer et al. in Experientia 20, page 336 (1964).

The process for the preparation of rifamycin L consists in contacting a rifamycin selected from rifamycin S and rifamycin SV, with the enzymatic activity of the mycelium of Streptomyces mediterranei ATTC 13685 in a water-lower alkanol mixture buffered at pH about 6.0–7.0 for 2–20 hours at 23–35° C. After completion of the conversion, the mycelium is removed by filtration and the filtrate adjusted to pH about 2.0 and extracted with a water unmiscible solvent, such as a water unmiscible lower alkanol, alkyl acetates, chloroform etc. The organic extract is in turn extracted with phosphate buffer pH about 7.0–7.5, and the organic layer containing unreacted rifamycin S and/or SV is discarded. After acidification to pH about 2.0 the mixture is again extracted with a water unmiscible solvent and the extract is chromatographed on silicagel.

The hereinafter given examples will better illustrate the process.

Rifamycin L is a crystalline substance with M.P. 152–153° C. The microanalysis gave the following values (average of 3 determinations):
Calcd. for $C_{39}H_{49}NO_{14}$ (M.W. 755.83) (percent): C, 61.97; H, 6.53; N, 1.85; O, 29.65. Found (percent): C, 61.82; H, 6.60; N, 1.85; O, 29.73.

The U.V. spectrum in phosphate buffer pH 7.38 shows an absorption maximum $$\lambda_{max}.\ 412\ m\mu,\ E^{1\%}_{1\,cm.}\ 242$$

The I.R. spectrum in chloroform show maxima at the following wavelengths, expressed in cm.$^{-1}$: 3400, 2800, 1750, 1700, 1685, 1635, 1610, 1595, 1570, 1540, 1455, 1405, 1370, 1345, 1315, 1115, 1080, 1045, 1015, 973, 942, 900, 845.

A potentiometric assay with 0.1 N NaOH, starting pH 2.2, gives $pK_{MCS}$ 2.75, E.W. about 799.

By mild alkaline hydrolysis riframycin L gives rifamycin SV and glycolic acid, thus giving chemical proof of its structure.

The in vitro activity of rifamycin L is of a high order, and is represented by the following table giving the minimum inhibitory concentration in γ/ml. against some representative strains.

| | |
|---|---|
| Staphylococcus aureus ATTC 6538 | 0.02 |
| Do, in the presence of bovine serum | 0.02 |
| Staphylococcus aureus Tour | 0.05 |
| Streptococcus pyogenes C 203 | 0.02 |
| Streptococcus faecalis ATTC 10541 | 0.2 |
| Diplococcus penumoniae UC 41 | 0.02 |
| Mycobacterium tuberculosis ATTC 9360 | 0.1 |

Also in vivo rifamycin L confirmed its good antibiotic activity. In the experimental infection from Staphylococcus aureus Tour, the $ED_{50}$ in mg./kg. by subcutaneous administration to mice was 24.6 (c. 1. 28.8–21.1. The compound is practically devoid of toxicity. The subcutaneous $LD_{50}$ in mice was higher than 500 mg./kg.

EXAMPLE

Oat meal agar slants seeded with Streptomyces mediterranei ATCC 13685 were used to inoculate 800 ml. of a culture medium distributed into 8 Erlenmeyer flasks and having the following composition:

| | G. |
|---|---|
| Beef extract | 5 |
| Peptone | 5 |
| Yeast antolysate | 5 |
| Enzymatic casein hydroylsate | 3 |
| Glucose | 20 |
| NaCl | 1.5 |
| Dist. water to 1000 ml. | | pH 7.3; sterilization 15 minutes at 120° C.

The flasks are incubated on a rotative shaker at 300 r.p.m. and 28° C. After 48 hours the obtained cultures are used to inoculate 8 litres of a medium of the following composition, distributed into two 10 litres fermentors:

|  | G. |
|---|---|
| Glucose | 90 |
| $(NH_4)_2SO_4$ | 15 |
| $KH_2PO_4$ | 2 |
| $MgSO_4 \cdot 7H_2O$ | 1 |
| $CaCO_3$ | 17 |
| Na diethylbarbiturate | 2 |
| $CuSO_4 \cdot 5H_2O$ | 0.0033 |
| $FeSO_4 \cdot 7H_2O$ | 0.01 |
| $ZnSO_4 \cdot 7H_2O$ | 0.05 |
| $MnSO_4 \cdot 4H_2O$ | 0.004 |

The fermentors are warmed to 28° C. and the medium is mechanically stirred at 800 r.p.m. and sterile air in quantity of 1 lt. per litre of culture is introduced every minute.

After 48 hours the grown mycelium is centrifugated, washed with phosphate buffer solution M/15 pH 6.5 and again suspended in 8 litres of the same buffer solution. To the suspension 1.6 g. of rifamycin S dissolved in 80 ml. of ethanol are added.

The product is allowed to be converted for 6 hours and then the mycelium is filtered off after addition of Hyflo. The mycelium is washed with water and the washings and the clear filtrate are combined, acidified to pH 2.0 with HCl and extracted with ethyl acetate.

The ethyl acetate solution containing different rifamycins is concentrated in vacuo to 500 ml. and again extracted with phosphate buffer M/15, pH 7.38. The spent organic solution containing unconverted rifamycin S is discarded. Rifamycins B, L and the others possibly present are again extracted in ethyl acetate from the buffer solution acidified to pH 2.0. Separation and final purification of rifamycin L are carried out by adsorbing the concentrated solution on a silicagel column of 60 cm. having 6 cm. of diameter and eluting with acetone.

Fractions of 100 ml. are collected. The fractions, which in thin layer chromatography show only a fluorescent spot in Wood light (Rf 0.9, adsorbent silicagel Merck and solvent acetone) are collected and concentrated to 10 ml.

After addition of 100 ml. of hexane, precipitation of rifamycin L, weighing 0.53 g. after having been dried, is obtained. Entirely comparable results were obtained using as starting material rifamycin SV instead of rifamycin S.

We claim:
1. Rifamycin L having the formula

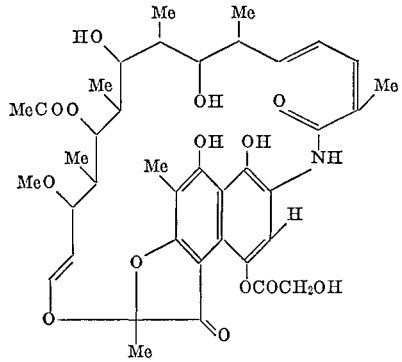

2. A process for preparing rifamycin L, which consists in contacting a rifamycin selected from rifamycin S and rifamycin SV, with the enzymatic activity of the mycelium of *Streptomyces mediterranei* ATCC 13685 in a water-lower alkanol mixture at pH about 6.0–7.0 for 2–20 hours at 23–35 degrees C., and isolating rifamycin L from the medium.

References Cited
UNITED STATES PATENTS

| 3,150,046 | 9/1964 | Sensi et al. | 195—80 |
| 3,197,468 | 7/1965 | Sensi et al. | 260—239.3 |
| 3,349,082 | 10/1967 | Maggi et al. | 260—239.3 |

NORMA S. MILESTONE, Primary Examiner

R. T. BOND, Assistant Examiner

U.S. Cl. X.R.

195—80; 424—244, 285